United States Patent
Katano

(10) Patent No.: US 9,034,537 B2
(45) Date of Patent: May 19, 2015

(54) DILUTER AND DISCHARGE VALVE ARRANGEMENT FOR A FUEL CELL SYSTEM

(75) Inventor: Koji Katano, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 509 days.

(21) Appl. No.: 12/992,019

(22) PCT Filed: May 12, 2009

(86) PCT No.: PCT/JP2009/058826
§ 371 (c)(1),
(2), (4) Date: Nov. 10, 2010

(87) PCT Pub. No.: WO2009/142125
PCT Pub. Date: Nov. 26, 2009

(65) Prior Publication Data
US 2011/0070527 A1  Mar. 24, 2011

(30) Foreign Application Priority Data
May 22, 2008  (JP) .................. 2008-134758

(51) Int. Cl.
*H01M 8/04*  (2006.01)

(52) U.S. Cl.
CPC ...... *H01M 8/04253* (2013.01); *H01M 8/04029* (2013.01); *H01M 8/04067* (2013.01); *H01M 8/04074* (2013.01); *H01M 8/04164* (2013.01); *Y02E 60/50* (2013.01)

(58) Field of Classification Search
CPC .............. Y02E 60/50; H01M 8/04067; H01M 8/04074; H01M 8/04164; H01M 8/04253
USPC .......................... 429/513, 440, 469
See application file for complete search history.

(56) References Cited

U.S. PATENT DOCUMENTS

2007/0243438 A1* 10/2007 Katano ........................ 429/26

FOREIGN PATENT DOCUMENTS

| JP | 2005-310717 A | 11/2005 |
| JP | 2006-155997 A1 | 6/2006 |
| JP | 2007-280802 A | 10/2007 |
| JP | 2007-294186 A | 11/2007 |

* cited by examiner

*Primary Examiner* — Ula C Ruddock
*Assistant Examiner* — Frank Chernow
(74) *Attorney, Agent, or Firm* — Kenyon & Kenyon LLP

(57) ABSTRACT

Provided is fuel cell system capable of eliminating any failure caused by freezing of a discharge valve during a low temperature while preventing an increase in size of the system. A fuel cell system is provided, the system including: a fuel cell; a diluter that dilutes a fuel-off gas discharged from the fuel cell with an oxidant-off gas discharged from the fuel cell to discharge the resulting gas to the outside; a fuel-off gas flow path that connects the fuel cell and the diluter; and a discharge valve that is provided to the fuel-off gas flow path to discharge a fuel-off gas flowing through the fuel-off gas flow path to the outside during a valve opening operation. In the fuel cell system, the discharge valve is integrally attached to the diluter.

10 Claims, 3 Drawing Sheets

DILUTER AND DISCHARGE VALVE ARRANGEMENT FOR A FUEL CELL SYSTEM

This is a 371 national phase application of PCT/JP2009/058826 filed 12 May 2009, which claims priority to Japanese Patent Application No. 2008-134758 filed 22 May 2008, the contents of which are incorporated herein by reference.

TECHNICAL FIELD

The present invention relates to a fuel cell system provided with a fuel cell.

BACKGROUND ART

In a fuel cell system that generates electrical power upon the supply of reaction gases (fuel gas and oxidant gas), water heated by a heating apparatus is made to flow in order to prevent freezing due to a low temperature at a circulation system line for hydrogen gas which serves as the fuel gas (see, for example, patent document 1).

PRIOR ART REFERENCE

Patent Document

Patent Document 1: JP2007-294186 A

SUMMARY OF THE INVENTION

Problem to be Solved by the Invention

In a fuel cell system, in particular, the amount of heat transferred to an exhaust/drain valve provided for discharging: moisture collected from an off gas from a fuel cell; and an off gas containing impurities, to the outside, tends to be deficient. The main reason for this is that, an electromagnetic drive type on-off valve is often employed since an exhaust/drain valve is opened as necessary, and thus the exhaust/drain valve receives heat from an off gas and from a solenoid only while the valve is being opened. Therefore, a freezing prevention operation that circulates warm water as described above is required. However, this has presented a problem in that providing a circulation system leads to an increase in size of the system.

The present invention has been made in light of the above circumstances, and an object of the invention is to provide a fuel cell system capable of eliminating any failure caused by freezing during a low temperature while preventing an increase in size of the system.

Means for Solving the Problem

In order to attain the above object, the present invention provides a fuel cell system including: a fuel cell; a diluter that mixes and dilutes a fuel-off gas discharged from the fuel cell with an oxidant-off gas discharged from the fuel cell to discharge the resulting gas to the outside; a fuel-off gas flow path that connects the fuel cell and the diluter; and a discharge valve that is provided to the fuel-off gas flow path to discharge a fuel-off gas flowing through the fuel-off gas flow path to the outside during a valve opening operation, wherein the discharge valve is integrally attached to the diluter.

The oxidant-off gas discharged from the fuel cell retains heat associated with power generation of the fuel cell (hereinafter referred to as heat from power generation), and thus, the diluter to which the oxidant-off gas is delivered throughout an operation is heated by the oxidant-off gas. Therefore, with the above configuration, the discharge valve can be heated by receiving heat from the diluter, and also, heat radiation from the discharge valve can be suppressed as much as possible.

Accordingly, compared with the case where a separate heat reserving system is provided, freezing of the discharge valve during a low temperature can be eliminated while an increase in size of the system is prevented.

In the fuel cell system, the diluter may have, at a part inside the diluter which is close to an outlet thereof, a discharge guide section which protrudes toward the inside of the diluter and which has: an end close to the protrusion which serves as an outlet-side gas inlet port through which a gas in the diluter is introduced; and another end which serves as an outlet-side gas outlet port through which the off gas introduced through the outlet-side gas inlet port is guided to the outside of the diluter, and a part of a wall that forms the discharge guide section and a part of a wall to which the discharge valve is attached may be integrally formed or connected to each other.

With such a configuration, the distance between the discharge guide section in the diluter and the discharge valve can be made as short as possible. Therefore, more heat can be transferred to the discharge valve from the discharge guide section through which the off gas retaining the heat from power generation of the fuel cell flows.

In the fuel cell system, a thermal conductive member having a higher thermal conductivity than thermal conductivities of the walls may be provided between an inner wall of the discharge guide section and the discharge valve.

With such a configuration, the heat transfer to the discharge valve can be carried out more satisfactorily by means of the thermal conductive member having a high thermal conductivity.

Effect of the Invention

The present invention can provide a fuel cell system capable of eliminating any failure caused by freezing of a discharge valve during a low temperature while preventing an increase in size of the system.

BEST MODE FOR CARRYING OUT THE INVENTION

A fuel cell system according to an embodiment of the present invention will hereinafter be described with reference to the drawings.

Figure 1:
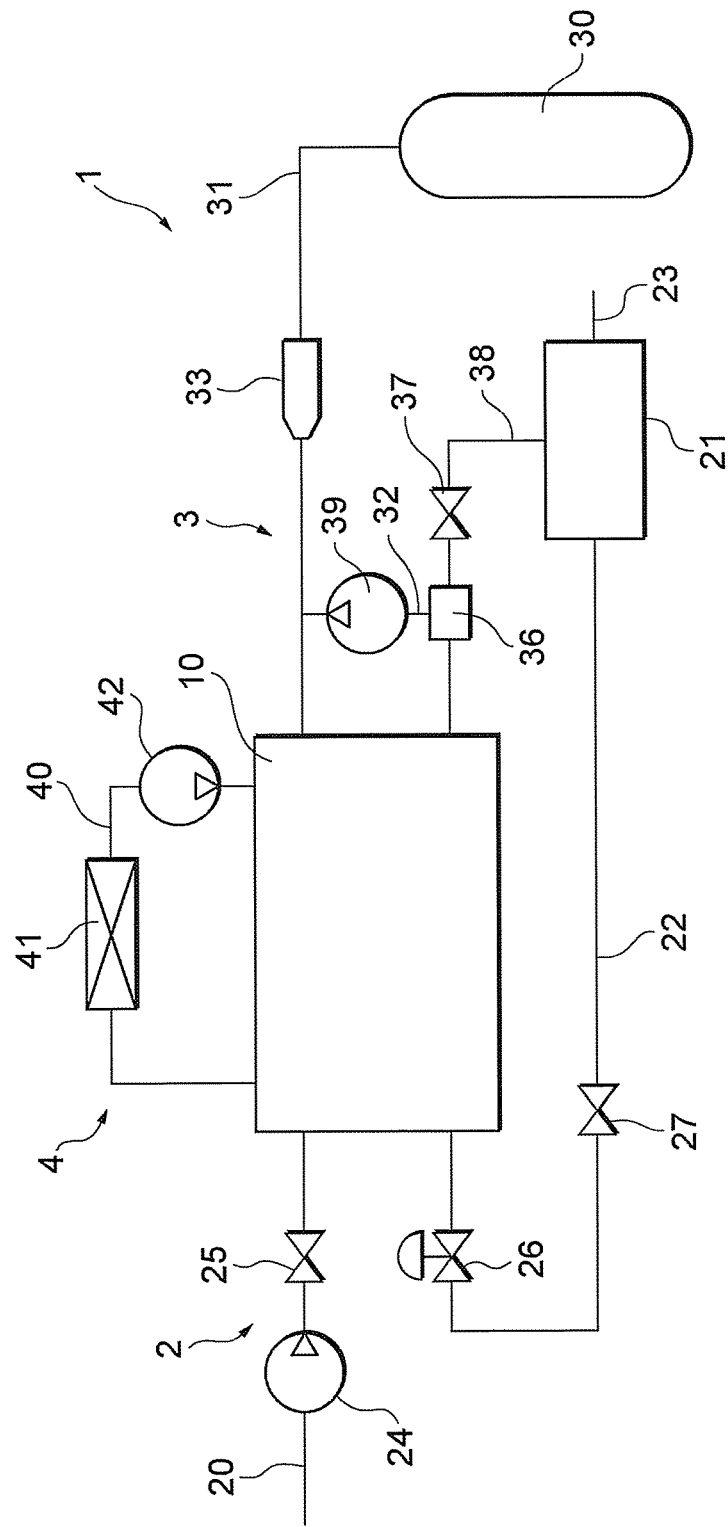
FIG. 1 is a configuration diagram of a fuel cell system according to an embodiment of the invention.

First, the configuration of a fuel cell system 1 which is a power generation system that uses a fuel cell 10 will be described with reference to FIG. 1.

The fuel cell system 1 includes the fuel cell 10 that generates electrical power upon the supply of reaction gases (oxidant gas and fuel gas), and also includes an oxidant gas pipe system 2 that supplies air serving as the oxidant gas to the fuel cell 10, a hydrogen gas pipe system 3 that supplies a hydrogen gas serving as the fuel gas to the fuel cell 10, a cooling system 4 that cools the fuel cell 10, etc.

The oxidant gas pipe system 2 includes: an air supply flow path 20 that supplies, to the fuel cell 10, air humidified by a humidifier (not shown in the figure); an air discharge flow path 22 that guides an air-off gas discharged from the fuel cell 10 to a diluter 21; and an exhaust flow path 23 for guiding the air-off gas from the diluter 21 to the outside of the fuel cell system 1. The air supply flow path 20 is provided with an air compressor 24 that pumps air to the fuel cell 10 and an inlet valve 25 that opens/closes the air supply flow path 20. The air discharge flow path 22 is provided with an air-pressure regulating valve 26 that adjusts air pressure and an outlet valve 27 that opens/closes the air discharge flow path 22.

The hydrogen gas pipe system 3 is provided with: a hydrogen supply flow path 31 for supplying a hydrogen gas from a hydrogen tank (fuel gas supply source) 30, which is a fuel supply source that stores a high-pressure hydrogen gas, to the fuel cell 10; and a circulation flow path (fuel-off gas flow path) 32 for returning an off gas of hydrogen gas discharged from the fuel cell 10 to the hydrogen supply flow path 31.

The hydrogen supply flow path 31 is provided with an injector 35, on the upstream side of the position of merge in the circulation flow path 32, which controls the supply of hydrogen gas from the hydrogen tank 30. The injector 35 is an electromagnetic drive type on-off valve in which a valve body is directly driven with an electromagnetic drive force with a predetermined drive period so as to be separated from a valve seat, thereby controlling a gas flow rate and gas pressure.

A discharge flow path (fuel-off gas flow path) 38 is connected to the circulation flow path 32 via a gas-liquid separator 36 and an exhaust/drain valve (discharge valve) 37. The gas-liquid separator 36 collects moisture from an off gas of hydrogen gas. The exhaust/drain valve 37 discharges (purges) moisture collected in the gas-liquid separator 36 and an off gas of hydrogen gas containing impurities in the circulation flow path 32.

Further, the circulation flow path 32 is provided with a hydrogen pump (circulation pump) 39 that: pressurizes the off gas of hydrogen gas in the circulation flow path 32 which is discharged from the fuel cell 10; and delivers the resulting gas to the hydrogen supply flow path 31 so as to return that gas to the fuel cell 10. Note that the off gas of hydrogen gas discharged via the exhaust/drain valve 37 and the discharge flow path 38 merges into and is diluted with an off gas of air in the air discharge flow path 22 by means of the diluter 21.

During the normal operation of the fuel cell system 1, a hydrogen gas is supplied, through the control of the injector 35, from the hydrogen tank 30 to a fuel electrode of the fuel cell 10 via the hydrogen supply flow path 31, and also, air is supplied to an oxidant electrode of the fuel cell 10 via the air supply flow path 20 by driving the air compressor 24, thereby generating electrical power. The off gas of hydrogen gas discharged from the fuel cell 10 is subjected to the removal of moisture in the gas-liquid separator 36 and then introduced into the hydrogen supply flow path 31 by driving the hydrogen pump 39, properly being mixed with a hydrogen gas from the hydrogen tank 30. The resulting gas is supplied to the fuel cell 10 again.

When the exhaust/drain valve 37 is opened at an appropriate time point, the moisture collected in the gas-liquid separator 36 and the off gas of hydrogen gas containing the impurities in the circulation flow path 32 are introduced into the diluter 21. Then, in the diluter 21, the moisture and the off gas of hydrogen gas are diluted by being mixed with the off gas of air discharged from the fuel cell 10 via the air discharge flow path 22, and the resulting gas is exhausted to the outside of the fuel cell system 1 via the exhaust flow path 23.

The cooling system 4 has a cooling flow path 40 that circulates cooling water through the fuel cell 10. The cooling flow path 40 is provided with: a radiator 41 that radiates heat of the cooling water to the outside; and a cooling water pump 42 that pressurizes the cooling water for circulation.

Figure 2:
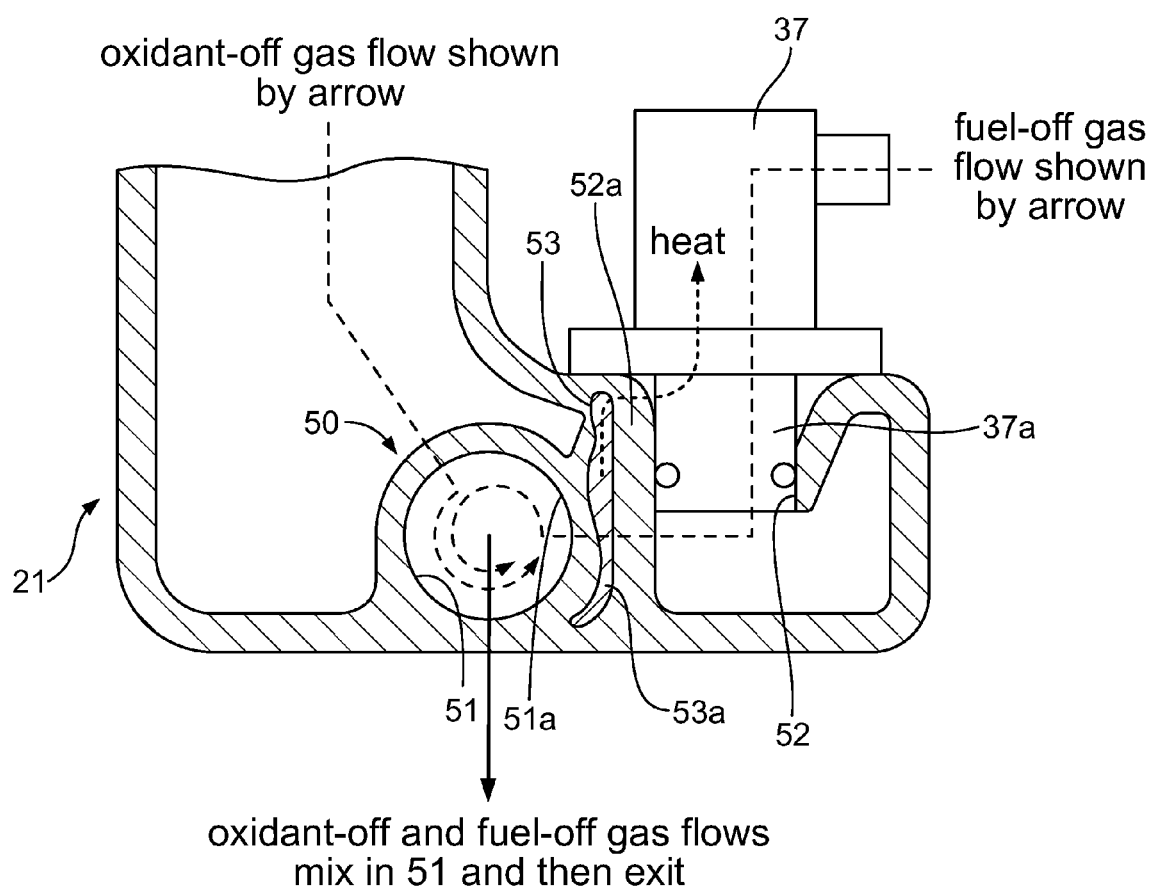
FIG. 2 is a cross-sectional view of a part of a diluter that explains the configuration of the diluter.

The diluter 21 is formed of, for example, resin so as to have an interior space. As shown in FIG. 2, an exhaust path 51 connected to the exhaust flow path 23 outside the diluter 21 is provided at a part inside the diluter 21 which is close to an outlet thereof. This exhaust path 51 is defined by a discharge guide section 50 having, e.g., a tubular shape which protrudes toward the inside of the diluter 21 and which has an end close to the protrusion which serves as an outlet-side gas inlet port through which the gas in the diluter 21 is introduced; and another end which serves as an outlet-side gas outlet port through which the off gas introduced through the outlet-side gas inlet port is guided to the outside of the diluter 21. The diluter 21 delivers the air-off gas obtained by diluting the off gas of hydrogen gas to the exhaust flow path 23 via the exhaust path 51.

Further, an attachment opening 52 is formed near the exhaust path 51 in the diluter 21, and an attachment 37a of the exhaust/drain valve 37 is inserted for attachment into the attachment opening 52. More specifically, this embodiment is configured such that the exhaust/drain valve 37 is integrally attached to the diluter 21 and is also configured such that the side closer to the inserted attachment 37 of the exhaust/drain valve 37 in a wall 51a in the discharge guide section 50 that forms the exhaust path 51 is integrally formed with the side closer to the exhaust path 51 in a wall 52a that forms the attachment opening 52. Note that when the wall 51a and the wall 52a are separately provided (as separate components), the walls 51a and 52a are connected while being in contact with each other.

Figure 3:
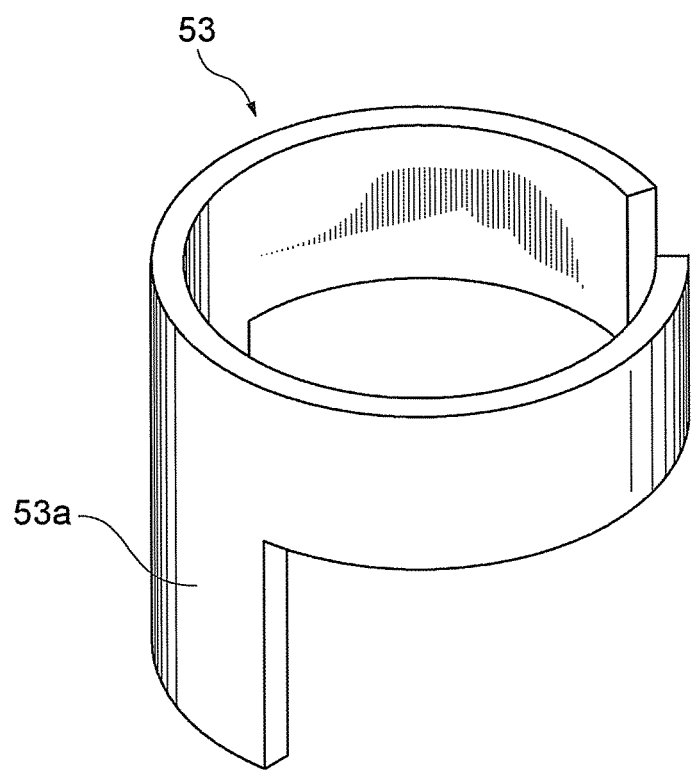
FIG. 3 is a perspective view showing a thermal conductive member provided to the diluter.

The diluter 21 has a thermal conductive member 53 that is provided to surround the attachment opening 52. The thermal conductive member 53 is formed of, e.g., a metal material having high thermal conductivity, such as aluminum, and may be formed into, e.g., a cylindrical shape as shown in FIG. 3. Further, as shown in FIG. 3, the thermal conductive member 53 may have a thermal conductive portion 53a having a part which is elongated in the axial direction, and the thermal conductive portion 53a may be arranged on the side of the exhaust path 51.

As described above, according to the fuel cell system 1 of the invention, the air-off gas discharged from the fuel cell 10 retains heat from power generation which is associated with power generation of the fuel cell 10, and thus, the diluter 21, to which the air-off gas is delivered throughout the operation, is heated also by the air-off gas. Further, since the exhaust/drain valve 37 is integrally attached to the diluter 21, the exhaust/drain valve 37 can be heated by receiving the heat from the diluter 21, and further, heat radiation from the exhaust/drain valve 37 can be suppressed as much as possible.

Accordingly, compared with the case where a separate heat reserving system is provided, freezing of the exhaust/drain valve 37 during a low temperature can be eliminated while an increase in size of the system is prevented.

In particular, the wall 51a of the discharge guide section 50 that forms the exhaust path 51 and the wall 52a that forms the attachment opening 52 in the diluter 21 are integrally formed. Thus, the distance between the exhaust path 51 and the exhaust/drain valve 37 can be made as short as possible. Therefore, more heat can be transferred to the exhaust/drain valve 37 from the exhaust path 51 through which the off gas retaining the heat from power generation of the fuel cell 10 flows.

Further, the thermal conductive member 53 is provided between an inner wall of the exhaust path 51 and the exhaust/drain valve 37, the thermal conductive member 53 having a higher thermal conductivity than thermal conductivities of at least the wall 51a of the discharge guide section 50 and the wall 52a of the attachment opening 52 that is integrally formed with the wall 51a. Accordingly, the transfer of heat to the exhaust/drain valve 37 can be carried out more satisfactorily by means of the thermal conductive member 53.

DESCRIPTION OF REFERENCE NUMERALS

1: fuel cell system, 10: fuel cell, 21: diluter, 32: circulation flow path (fuel-off gas flow path), 38: discharge flow path (fuel-off gas flow path), 37: exhaust/drain valve (discharge valve), 50: discharge guide section, 51: exhaust path, 51a, 52a: walls, 53: thermal conductive member

What is claimed is:

1. A fuel cell system comprising: a fuel cell; a diluter that dilutes a fuel-off gas discharged from the fuel cell with an oxidant-off gas discharged from the fuel cell to discharge the resulting gas to the outside; a fuel-off gas flow path that connects the fuel cell and the diluter; and a discharge valve that is provided to the fuel-off gas flow path to discharge a fuel-off gas flowing through the fuel-off gas flow path to the outside during a valve opening operation, wherein
the discharge valve is integrally attached to the diluter; and
the diluter has an interior space where the off-gases mix and an outlet through which the mixed off-gases exit, the diluter further having a discharge guide section close to the outlet of the diluter, the discharge guide section protruding toward the interior space of the diluter, wherein the mixed off-gases in the diluter enters the discharge guide section at one end and exits at another end of the discharge guide section to the outside of the diluter, and
wherein a part of a wall that forms the discharge guide section is integrally formed or connected while being in direct contact to a part of a wall to which the discharge valve is attached, and
wherein a thermal conductive member having a higher thermal conductivity than thermal conductivities of the walls is provided between an inner wall portion of the discharge guide section and an inner wall portion of the wall to which the discharge valve is attached.

2. The fuel cell system according to claim 1, wherein the inner wall portion of the discharge guide section is on a side closest to the inner wall portion of the wall to which the discharge valve is attached, and vice versa.

3. The fuel cell system according to claim 2, wherein the thermal conductive member is provided to surround the attachment opening.

4. The fuel cell system according to claim 3, wherein the thermal conductive member has a portion formed into a cylindrical shape and a thermal conductive portion having a part which is elongated in an axial direction thereof, the thermal conductive portion being arranged on the side of the discharge guide section.

5. The fuel cell system according to claim 1, wherein:
an exhaust path connected to an exhaust flow path outside the diluter is formed at a part inside the diluter which is close to the outlet thereof;
an attachment opening into which the discharge valve is inserted for attachment is formed near the exhaust path; and
a wall portion of the discharge guide section on a side closest to the attachment opening is integrally formed with a wall portion of the attachment opening that is closest to the exhaust path.

6. The fuel cell system according to claim 1, wherein:
an exhaust path connected to an exhaust flow path outside the diluter is formed at a part inside the diluter which is close to an outlet thereof;
an attachment opening into which the discharge valve is inserted for attachment is formed near the exhaust path; and
a side closer to the inserted discharge valve in a wall that forms the exhaust path and a side closer to the exhaust path in a wall that forms the attachment opening are separately formed, and the separately formed walls are connected while being in contact.

7. The fuel cell system according to claim 2, wherein the part of the wall that forms the attachment opening is formed by partially folding, toward the inside of the diluter, an upper end of an outer wall of the diluter.

8. The fuel cell system according to claim 1, further comprising an exhaust path inside the diluter close to the outlet thereof, the exhaust path being connected to an exhaust flow path outside the diluter, wherein a surface that faces the exhaust path from among outer surfaces of the thermal conductive member conforms to the cross-sectional shape of the exhaust path.

9. The fuel cell system according to claim 1, further comprising an exhaust path inside the diluter close to the outlet thereof, the exhaust path being connected to an exhaust flow path outside the diluter, wherein the thermal conductive member is arranged such that a distance thereof from the exhaust path is shorter than a distance thereof from the discharge valve.

10. The fuel cell system according to claim 8, wherein the thermal conductive member is arranged such that a distance thereof from the exhaust path is shorter than a distance thereof from the discharge valve.

* * * * *